April 12, 1932.  D. I. REITER  1,853,880
CAPPED PIN
Filed Feb. 7, 1930   2 Sheets-Sheet 1

INVENTOR
Daniel I. Reiter
BY
ATTORNEY

April 12, 1932.  D. I. REITER  1,853,880
CAPPED PIN
Filed Feb. 7, 1930   2 Sheets-Sheet 2

INVENTOR
Daniel I. Reiter
BY
ATTORNEY

Patented Apr. 12, 1932

1,853,880

UNITED STATES PATENT OFFICE

DANIEL I. REITER, OF NEW YORK, N. Y.

CAPPED PIN

Application filed February 7, 1930. Serial No. 426,457.

This invention relates to capped pin fasteners and particularly, to those designed to pin together the fabric slip covers of automobiles and the fabric upholstery thereof without the aid of snap fasteners, and designed further to resist withdrawal of the fastener accidentally or intentionally. My invention contemplates the provision of a pin fastener having simple and efficient means for preventing withdrawal of the pin after it has once been inserted into place.

My invention further contemplates the provision of a pin fastener which is designed for economical manufacture in large quantities and which is simple in construction, easy to insert rapidly by unskilled persons, efficient in operation and inexpensive to produce, and which is so constructed that the cap assumes a flat position and lies flat on the fabric after it has been inserted into place.

The various objects of my invention will be clear from the description which follows, and from the drawings, in which, Fig. 1 is an elevational view of the blank from which the cap of my improved pin may be formed, showing particularly, the terminal fingers and slots thereof.

Figure 1:
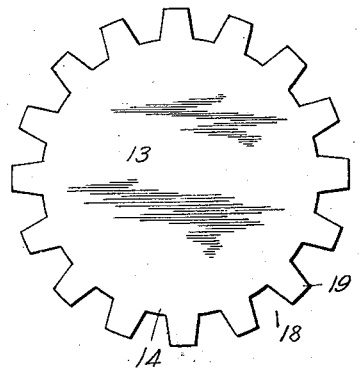

In that practical embodiment of my invention which I have illustrated by way of example, I provide a single length of wire which is pointed at both of its ends and bent into proper shape to form a head or cap engaging portion 10 intermediate of the ends of the wire, and to form a main pin 11 at one end of the length of wire and a secondary pin or prong 12 at the other end of the length of wire.

The head 10, intermediate of the pins 11 and 12, is preferably made arcuate in shape to conform to the shape of the peripheral part of the cap 13, and preferably subtends an angle of less than 270° or of approximately 180° in all of the modified forms illustrated. Said head 10 is preferably continuous and unbroken throughout its entire length and is adapted to have a suitable cap as 13 secured thereto, and while shown as arcuate or partly circular in shape, may be made of any desired shape such as polygonal, square and the like to conform to the shape of the cap used therewith, without departing from the spirit of the invention, and as will be obvious to those skilled in the art, and hence which need not be shown or further described.

The cap 13 is preferably made of sheet material such as sheet metal, celluloid, horn, or other sheet material suitable and heretofore customarily used in the making of buttons, caps for buttons, fasteners, or the like.

Figure 2:
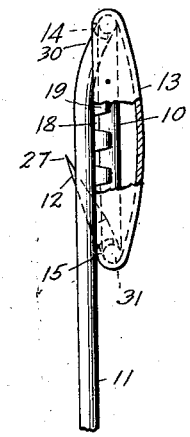
Fig. 2 is a side view of the pin with the cap assembled in place thereon, part of the cap being broken away to show the arcuate head of the pin, and the cap flange applied thereto.
Figure 3:
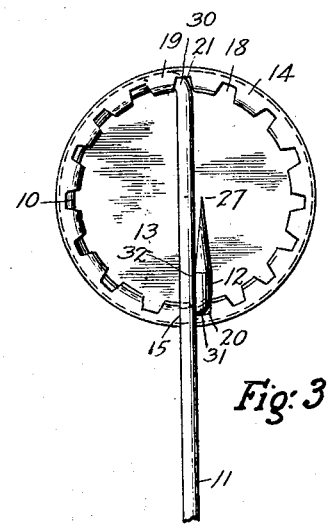
Fig. 3 is a rear view of the pin, showing particularly, the main pin and the prong passed through said certain slots between adjacent fingers to prevent turning movement of the pin relatively to the cap.
Figure 5:
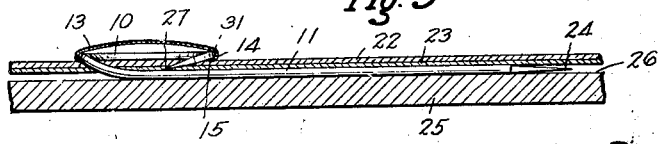
Fig. 5 is a cross-sectional view of part of the upholstered body of an automobile showing the pin in operative position for securing the slip cover to the upholstery, and Figs. 6 to 17 inclusive are rear views of various forms of my invention, showing a few of the many typical arrangements of the main pin and of the withdrawal preventing prong relatively to each other and to the cap.
Figure 6:
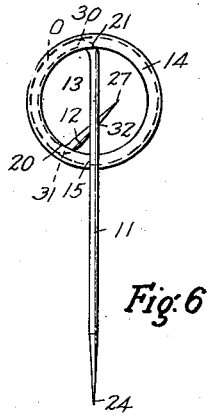

The cap 13 is preferably provided with a peripheral, rearwardly arranged flange as 14 adapted to be bent forwardly and outwardly to a sufficient extent to grip the head 10 firmly and permanently. While the flange in Figs. 6 to 17 inclusive is shown as continuous, unserrated and unslitted, for purposes of ease of illustration and clarity, it will be understood that the terminal edges of said flange may be serrated or slitted or both, if desired, in the manner shown in Figs. 1, 2 and 3.

Referring to Fig. 1, I have there shown a blank from which the cap 13 may be formed. Said blank is made of the proper shape to be bent into its final circular form, or it may be made polygonal in outline so as to be bent into polygonal form about the head of the pin. In order to provide a flange 14 which may be readily bent about the head 10 of the wire with maximum efficiency and ease, and to present an increased, smooth appearance, I prefer to provide a series of spaced slots as 18 cut inwardly from the peripheral edge of the blank and forming a series of spaced fingers 19 therebetween. Said fingers may be readily bent about the head 10 by means of a simple clinching tool to hold the wire properly in place. The slots 18 are furthermore comparatively closely spaced so that either the prong 12 or the main pin 11 at the points 20 and 21, respectively, may pass through one of the slots 18, and between adjacent pairs of fingers 19. By so arranging the pin and prong to extend through slots between adjacent pairs of fingers, the wire member is not only firmly secured to the cap 13 but is prevented from rotating relatively to the cap. Since the slots are comparatively closely spaced, at least one of the pins will pass through a slot even though the cap and the wire member are assembled more or less inaccurately and without deliberately arranging one or both of the pins in the slots.

The main pin 11 is bent from one end as 30 of the head 10 so that at the point 15, where the pin 11 passes the flange 14, said pin is in pressed or sprung contact with said flange. If the bend 30 does not extend rearwardly to any substantial extent, the pin 11 may therefore assume a slightly rearward direction to pass the opposite point 15 of the flange. As the pin 11 is passed through and under the fabric, the fabric sheet is forced between the pin 11 and the flange 14 at the point 15 to separate the pin from the flange at that point, and the fabric is thereby frictionally gripped between the pin and the flange. Similarly, the secondary pin or prong 12 is bent from the other end 31 of the head 10, and is arranged to extend in a direction approximately opposite to that of the pin 11, said pin 12 being entirely inside of the cap and presenting a rearwardly directed point. As shown in Figs. 3, 6, 16 and 17, the prong 12 may be arranged so as to contact with the main pin 11, being sprung toward said main pin, so that the fabric entering between the prong and the pin is frictionally gripped therebetween as at 32, owing to their tendency to come together.

The tendency to compress, tension or otherwise stress the fabric between the pin and the prong may be otherwise induced, as for example, by directing the prong at various angles to the pin as shown in Figs. 6, 7, 8, 9 and 12 to 17 inclusive. The cooperating action above described, I have found, tends to assist the prong 12 in preventing withdrawal of the pin from the fabric, or accidental loosening of the pin. The fabric stressing cooperating of the pin and prong may also be attained, if desired, as illustrated, without sprung contact of the pin and prong.

To insert the pin fastener in place, the main pin 11 is passed through the slip cover 22 which is to be secured in place, and through the permanently arranged upholstery fabric 23, until the pin point 24 contacts with the wood or metal panel or other rigid backing 25. The resistance of said backing 25 causes the pin point to slide along the surface 26 of said back and to lie between said surface and the upholstery 23, though the pin point may, to a slight extent, rise again to enter the upholstery 23. When the cap 13 has been pressed in the proper direction to insert the pin 11 fully into the material, which during this operation, passes between the pin section 11 and the flange 14 at the point 15 and is thereby frictionally engaged at the point 15, the cap is then retracted to a slight extent. The retracting movement causes the point 27 of the prong 12 to enter the fabric 23 and to pass therethrough and into the fabric 22, whereby further retraction of the pin is prevented by the engagement of the fabric with the cap at the base of the prong, and my improved fastener is thereby retained in place against ordinary removal.

Figure 4:
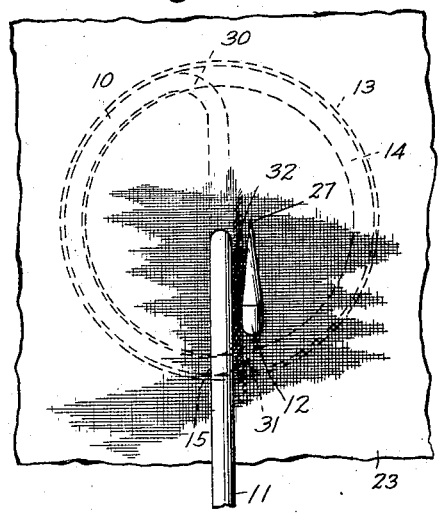
Fig. 4 is a rear view of my improved pin as it appears when in operative position applied to two layers of fabric, showing the cooperation between the prong and the main pin section to stress the fabric.

When the prong 12 is angularly disposed relatively to the main pin 11, the retracting movement in the direction of the main pin causes the prong 12 to pull or push the fabric away from or toward the main pin to stress the fabric, depending upon the direction in which the prong extends. In the cases where the prong crosses or contacts with the main pin, the prong is forced by the fabric entering therebetween away from the main pin and due to its normal sprung engagement with the main pin, causes the fabric to be frictionally gripped therebetween, as indicated at 32, Fig. 4. As illustrated in Figs. 3, 6, 16 and 17, the prong 12 is in such sprung contact with the main pin 11 and thereby aids in preventing withdrawal of the pin.

It will be understood that the point 27 of the prong 12 may extend rearwardly of the main pin 11, and that said prong is preferably directed rearwardly to a sufficient extent to accomplish that purpose. It will be understood, however, that the prong need not necessarily be of such length and may terminate forwardly of the pin 11 or in the same plane as said pin, if desired, without materially affecting the proper operation thereof.

It will be noted that in Figs. 3, 6, 8, 10, 12, 14, 16 and 17, the main pin 11 is so arranged as to pass the cap substantially at the center thereof, though it will be understood that said pin need not necessarily be so arranged as illustrated in Figs. 7, 9, 11, 13 and 15. It will further be seen that while the prongs 12 is arranged substantially parallel to the pin 11 as shown in Figs. 3, 4, 10 and 11, said prong may be disposed at any angle to bring it within the cap, as may be found convenient or desirable. For example, in Fig. 7, the prong 12 is shown as directed away from the pin. This causes the material to be pulled into the space between the pin and prong and provides a desirable added stress on the material tending to prevent withdrawal of the pin from the fabric, as has been heretofore explained.

Figure 7:
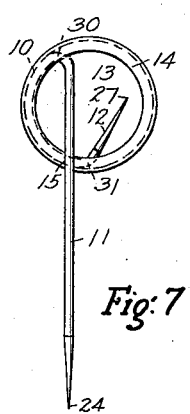
Figure 8:
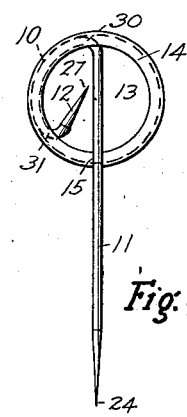
Figure 9:
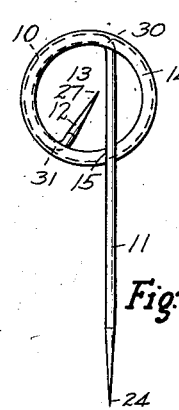
Figure 10:
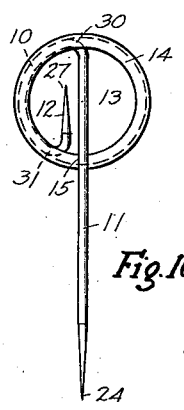
Figure 11:
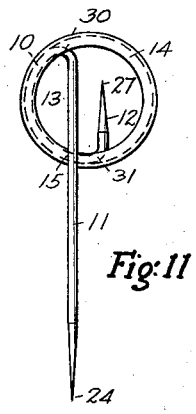
Figure 12:
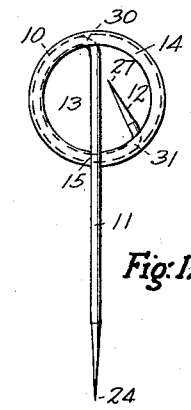
Figure 13:
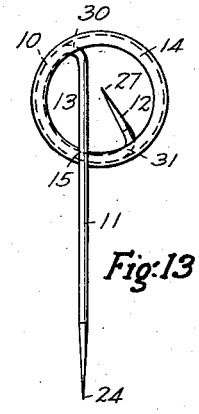
Figure 14:
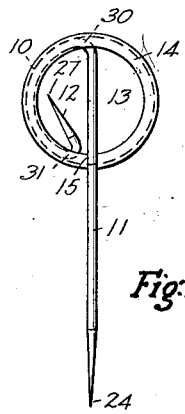
Figure 15:
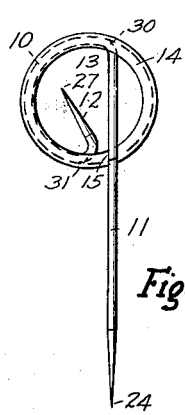
Figure 16:
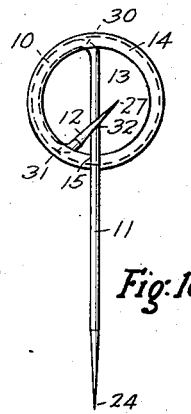
Figure 17:
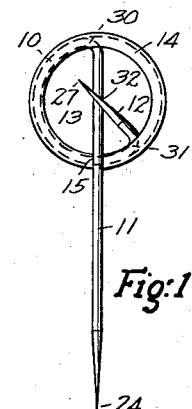

Fig. 15 shows a similar structure excepting that the head 10 of the wire is there made to subtend an angle greater than 180° and less than 270°, whereas in Fig. 7, the head subtends an angle of less than 180°. The various other relative positions of the pin 11 and of the prong 12 need not be described in further detail since the possible operative arrangements thereof will be obvious to those skilled in the art, and since a great variety of relative positions are possible, as will be seen from the various modified forms of my invention already illustrated.

It will be seen that I have provided a simple and inexpensive pin fastener well adapted for the purposes for which it is intended and designed to meet the severe requirements of practical use.

It will further be understood that while I have shown and described various embodiments of my invention, I do not wish to be understood as limiting myself thereto since I intend to claim my invention as broadly as may be permitted by the state of the prior art and the scope of the appended claims including the equivalents of the elements therein specified.

I claim:

1. A pin fastener comprising a single length of wire pointed at both ends thereof and including a longer pin element bent from one end of the wire to extend in one direction, and a shorter pin element bent from the other end of the wire and directed approximately in the opposite direction and rearwardly to a sufficient extent to project rearwardly beyond the most rearward part of the longer pin element, said length of wire having a continuous arcuate portion intermediate of, joining, and integral with the unpointed ends of said pin elements, and subtending an angle greater than 90° and less than 270°, and a cap of sheet material having a peripheral flange forced about the entire length of the arcuate portion of the wire between said pin elements for securing the cap to said arcuate portion.

2. A pin fastener comprising a single length of wire, said wire including a cap engaging head subtending less than 270° and more than 90° intermediate the ends thereof, a main pin element bent to form a substantially straight pointed main pin, and a secondary pin element bent from the other end of the wire and bent into sprung contact with the main pin element and directed rearwardly of said main pin element, and a cap for said wire of sheet material and terminating in a flange having peripherally spaced fingers of uniform dimensions separated by slots of uniform dimensions, and each of substantially the size and shape of each of the fingers, said fingers being bent about the head and thereby holding the wire in place against relative movement of said wire and said cap, said pin elements being arranged to pass through spaced slots of said flange, and said main pin element being sprung into engagement with the flange to contact with said flange at a point near the juncture of the secondary pin element and the head.

3. A pin fastener comprising a cap terminating in a peripheral rear flange, and a length of round wire held by said cap between the flange and the rear face of the remainder of the cap, said length of wire having an arcuate portion bent from the wire intermediate the ends thereof, nearer one end of said length of wire than the other, a pointed prong integral with the lower end of said arcuate portion and bent in a direction to extend rearwardly and upwardly therefrom, and a substantially straight main pin bent from the other end of said arcuate portion and extending downwardly therefrom past the lowermost part of said flange and pointed at its lowermost extremity.

4. The combination with a pair of fabric sheets, of a pin fastener for securing said sheets together, comprising a cap of sheet material having a peripheral rear flange thereon, and a length of wire pointed at both ends and secured to the cap by said flange, said length of wire including a head intermediate the ends thereof inserted between said flange and the rear face of the convex portion of the cap and permanently held therebetween throughout its length, a main pin bent from the upper end of the head and extending downwardly past, and in pressed contact with, the lower part of the flange, and a prong bent from the other end of the head of less length than the main pin, and directed rearwardly and approximately upwardly and also directed transversely toward a side of the cap into angular relation to the main pin, and so positioned relatively to the main pin as to stress that portion of the fabric sheets lying between said prong and said main pin into which the fastener is inserted after said main pin has been passed into the fabric as far as possible in one direction and then retracted.

5. A pin fastener comprising a cap of sheet material provided with a rear flange, and a length of wire pointed at both ends and secured to said cap by said flange, said length of wire including a head intermediate the ends thereof and inserted in front of said flange and held thereby, a main pin bent from one end of said head extending in one direction, normally in contact with the flange and adapted to pass into a piece of fabric for compressing the fabric between the main pin and the adjacent part of the flange, and a prong bent from the other end of the head to extend toward a side of the cap and rearwardly and upwardly and terminating in a free point and having its fixed end spaced from the bent end of the main pin section approximately 180° and extending approximately in the opposite direction to enter the fabric on the partial retraction of the fastener therefrom and to prevent total retraction of the main pin from the fabric.

6. A pin fastener comprising a cap of sheet material having a rear flange and a length of wire pointed at both ends secured to the cap by said flange, said length of wire including a continuous arcuate head intermediate of its ends and inserted forwardly of and engaging said flange throughout its length and held thereby to the cap, a substantially straight main pin extending in one direction from the upper end of said head and a prong extending in substantially the opposite direction from the lower end of said head and integral therewith to a point rearwardly of the main pin, said prong being arranged to extend angularly relatively to the main pin and toward one side of the cap to exert stress upon that portion of the material in which said fastener is operatively inserted and included between the points of engagement of said pin and prong with said materials.

7. A pin fastener comprising an imperforate cap of sheet material having its front portion convexed forwardly and terminating in a peripherally slotted rear flange and a length of wire pointed at both ends secured to the cap by said flange, said length of wire including a continuous arcuate head intermediate of its ends and inserted forwardly of said flange and held thereby to the cap, a substantially straight main pin extending in one direction from the upper end of said head and passing through one of the peripheral slots of the flange, and a prong extending in substantially the opposite direction from the extreme end of said head and integral therewith, to a point rearwardly of the main pin, and passing through another of said slots spaced angularly from the first-mentioned slot approximately 180°.

8. In a pin fastener, a length of wire bent intermediate of its ends into an arcuate head adapted to be held in place throughout its entire length, a main pin section bent from one end of the head and extending in one direction and pointed, and a secondary pin bent from the other end of said head and extending in substantially the opposite direction and pointed, and of less length than the main pin, and extending rearwardly past the rearmost part of the main pin.

9. A pin fastener comprising a cap terminating in a peripheral flange and a length of wire held intermediate its ends by said flange to the cap, said length of wire including an intermediate head shaped throughout its entire length to conform to the shape of the flange and held thereby throughout its entire length, a pointed main pin bent from one end of the head, crossing the rear of said cap and extending past said cap, and a shorter secondary pointed pin bent from the other end of the length of wire and extending generally rearwardly and toward the juncture of the main pin and the head, said secondary pin extending toward a side of the cap and angularly arranged relatively to the main pin to stress the material through which the main pin is passed after partial retraction of said main pin.

10. In a pin fastener, the combination with a sheet metal head having a front portion and a rear terminal flange provided with peripheral spaced slots forming peripheral fingers therebetween, of a length of round wire having a head intermediate of its ends, said head being held to said cap throughout its entire length by bending said fingers forwardly about said head, a straight main pin bent from the upper end of said head and sprung into contact with said flange at a point near the lowermost part of said flange, said main pin being pointed at its lowermost end, and a pointed prong bent from the other end of said head upwardly and rearwardly and in pressed contact with said main pin at a point intermediate of the ends of the prong, the point of said prong being arranged rearwardly of said main pin and above the center of the cap, whereby said prong stresses the material through which the main pin is passed after partial retraction of said main pin and said main pin compresses the material between it and said flange and withdrawal of the pin from the material is thereby resisted.

DANIEL I. REITER.